US009007969B1

(12) United States Patent
Venkatesh

(10) Patent No.: US 9,007,969 B1
(45) Date of Patent: Apr. 14, 2015

(54) AUTOMATIC TIME SLICING OF BEACON INTERVALS IN HIGH DENSITY WIRELESS LAN

(75) Inventor: Narasimhan Venkatesh, Hyderabad (IN)

(73) Assignee: Redpine Signals, Inc., San Jose, CA (US)

( * ) Notice: Subject to any disclaimer, the term of this patent is extended or adjusted under 35 U.S.C. 154(b) by 169 days.

(21) Appl. No.: 13/284,899

(22) Filed: Oct. 29, 2011

Related U.S. Application Data

(60) Provisional application No. 61/407,909, filed on Oct. 29, 2010.

(51) Int. Cl.
*H04B 7/00* (2006.01)
*H04W 4/20* (2009.01)

(52) U.S. Cl.
CPC ...................................... *H04W 4/20* (2013.01)

(58) Field of Classification Search
CPC ....... H04W 84/18; H04B 7/0697; H04B 7/08; H04B 10/0773; H04B 10/0775; H04L 1/0041; H04L 1/0057; H04L 1/06; H04L 1/0618; H04L 27/186
USPC .................................................. 370/310–350
See application file for complete search history.

(56) References Cited

U.S. PATENT DOCUMENTS

| | | | |
|---|---|---|---|
| 8,228,845 B2 * | 7/2012 | Park et al. ...................... | 370/328 |
| 2009/0059886 A1 * | 3/2009 | Pan et al. ....................... | 370/345 |
| 2010/0189021 A1 * | 7/2010 | He et al. ......................... | 370/311 |
| 2012/0327829 A1 * | 12/2012 | Sinha .............................. | 370/311 |
| 2012/0327925 A1 * | 12/2012 | Lee et al. ....................... | 370/345 |
| 2013/0100942 A1 * | 4/2013 | Rudnick et al. ............... | 370/337 |

* cited by examiner

*Primary Examiner* — Fan Ng
(74) *Attorney, Agent, or Firm* — File-EE-Patents.com; Jay A. Chesavage

(57) ABSTRACT

A wireless LAN station having a MAC address and receiving beacon frames indicating a beacon interval selects a sub-interval from the beacon interval for transmission and reception of wireless signals. The beacon sub-interval used by each set of stations for transmission and reception is preferably ½ⁿ of the beacon interval, where n is the number of device-unique assignment bits, such as MAC address. Each station thereby self-assigns itself one of the sub-intervals as a segment for transmission and reception, thereby reducing collisions and re-transmissions in a congested access point.

17 Claims, 2 Drawing Sheets

Distributed Access Points in Stadium

Distributed Access Points in Stadium

Access Point and Stations in Stadium

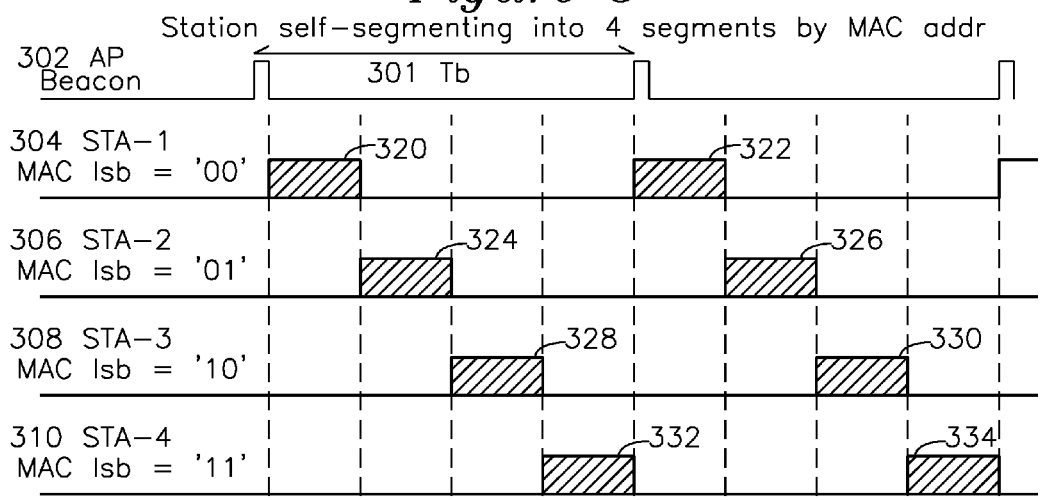
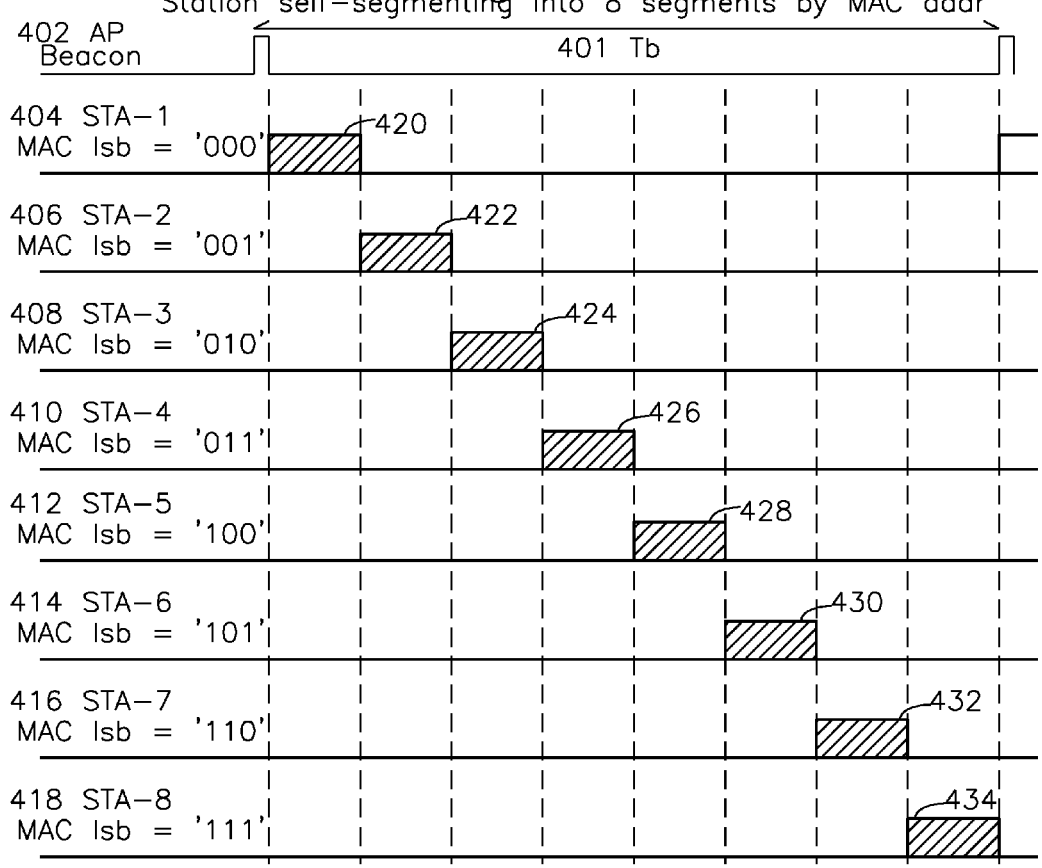

AUTOMATIC TIME SLICING OF BEACON INTERVALS IN HIGH DENSITY WIRELESS LAN

The present invention claims priority of provisional patent application 61/407,909 filed Oct. 29, 2010.

FIELD OF THE INVENTION

The present invention relates to a method and apparatus for providing optimal bandwidth use of a Wireless Local Area Network (WLAN). In particular, the invention allows a large number of users to efficiently utilize available bandwidth in a shared media environment.

BACKGROUND OF THE INVENTION

Wireless networking is described in the IEEE (Institute of Electronic and Electrical Engineers) 802.11 WLAN standard, which has become the de-facto standard in wireless networking. However, in settings with a large concentration of Wi-Fi users, the quality of connectivity tends to fall drastically. In environments such as sports stadiums, there is often a gathering of several tens of thousand spectators, a large fraction of whom attempt to use the Wi-Fi access provided locally. Since the wireless channel is a shared medium, there are often excessive collisions of packets on air, in spite of the IEEE 802.11 collision avoidance mechanism. The prior art IEEE 802.11 collision avoidance mechanism involves the setting of a random back-off interval beginning at the time when the medium is sensed as free. Each node picks its own random count value and counts down slot times until it reaches the end of its count at which point it decides to transmit. However, it still might face a collision through one or other nodes coincidentally picking the same random value. Upon a subsequent collision, the range of values of the random number increases so as to minimize the chance of further collisions. This continues until a maximum back-off value (or 'contention window' size) is reached. The size of the contention window is usually restricted between a minimum and a maximum value. The minimum value is used when collisions are rare. However, this mechanism does not ensure a collision free scenario. It only presents an overall fair user experience and works best when accesses and usage cases are unrelated—that is, when accesses are as randomized as possible. The probability of a collision (C) given a contention window size (CW) and number of nodes N is:

$$C = 1 - \left[\frac{CW-1}{CW}\right]^{N-1} \quad \text{(equation 1)}$$

A low collision rate also requires that the number of available slot times in the contention window be significantly higher than the number of contending nodes, as shown in the table below derived from equation 1:

| Number of node | CW | Prob. Co |
|---|---|---|
| 5 | 127 | 3.11% |
| 15 | 127 | 10.48% |
| 25 | 127 | 17.28% |
| 50 | 127 | 32.11% |
| 80 | 127 | 46.45% |
| 100 | 127 | 54.28% |
| 130 | 127 | 63.93% |

-continued

| Number of node | CW | Prob. Co |
|---|---|---|
| 150 | 127 | 69.21% |
| 200 | 127 | 79.26% |
| 300 | 127 | 90.59% |

Each collision results in wasted use of the shared media, adding to overall loss of efficiency of use of the wireless medium.

OBJECTS OF THE INVENTION

A first object of this invention is the self-allocation of a communications window within a beacon interval, the allocated window being $\frac{1}{2^n}$ of the beacon interval, where n is the number of bits used by the station to select which allocated window to use.

A second object of this invention is the self-allocation of a communications window within a beacon interval, the allocated window being $\frac{1}{2^n}$ of the beacon interval, where n is the number of least significant bits of the station MAC address used to select a particular allocated window.

A third object of the invention is a WLAN station which allocates its own communication window with an access point using the beacon interval emitted by the access point, where each communication window used by a particular access point occupies a canonical time slot which is $\frac{1}{2^n}$ of the beacon interval, each of the stations using the least significant n bits of the station MAC address to select a particular one of the $2^n$ communications windows for transmitting and receiving wireless signals.

SUMMARY OF THE INVENTION

The invention is an apparatus and method for self-allocation of a communications window by wireless stations coupled to an access point, the wireless stations self-allocating the time window from a plurality of available time windows subdivided from an access point beacon interval. In one embodiment of the invention, the access point transmits beacon frames with a particular beacon interval, and the beacon interval is sub-divided into $2^n$ communications intervals, each communication interval used by stations with the same n bits. In one embodiment, the n bits are the least significant bits of the MAC address, so for n=2, the beacon interval is divided into 4 separate communication intervals, and stations with a MAC address ending in binary '00' use one of the four communications intervals, and stations with a MAC address ending in binary '01', '10', and '11' use each of the three remaining communications intervals.

BRIEF DESCRIPTION OF THE DRAWINGS

FIG. 3 shows stations self-assigning beacon transmissions for the case of n=4 communication intervals.

FIG. 4 shows stations self-assigning beacon transmissions for the case of n=8 communication intervals.

DETAILED DESCRIPTION OF THE INVENTION

Figure 1:
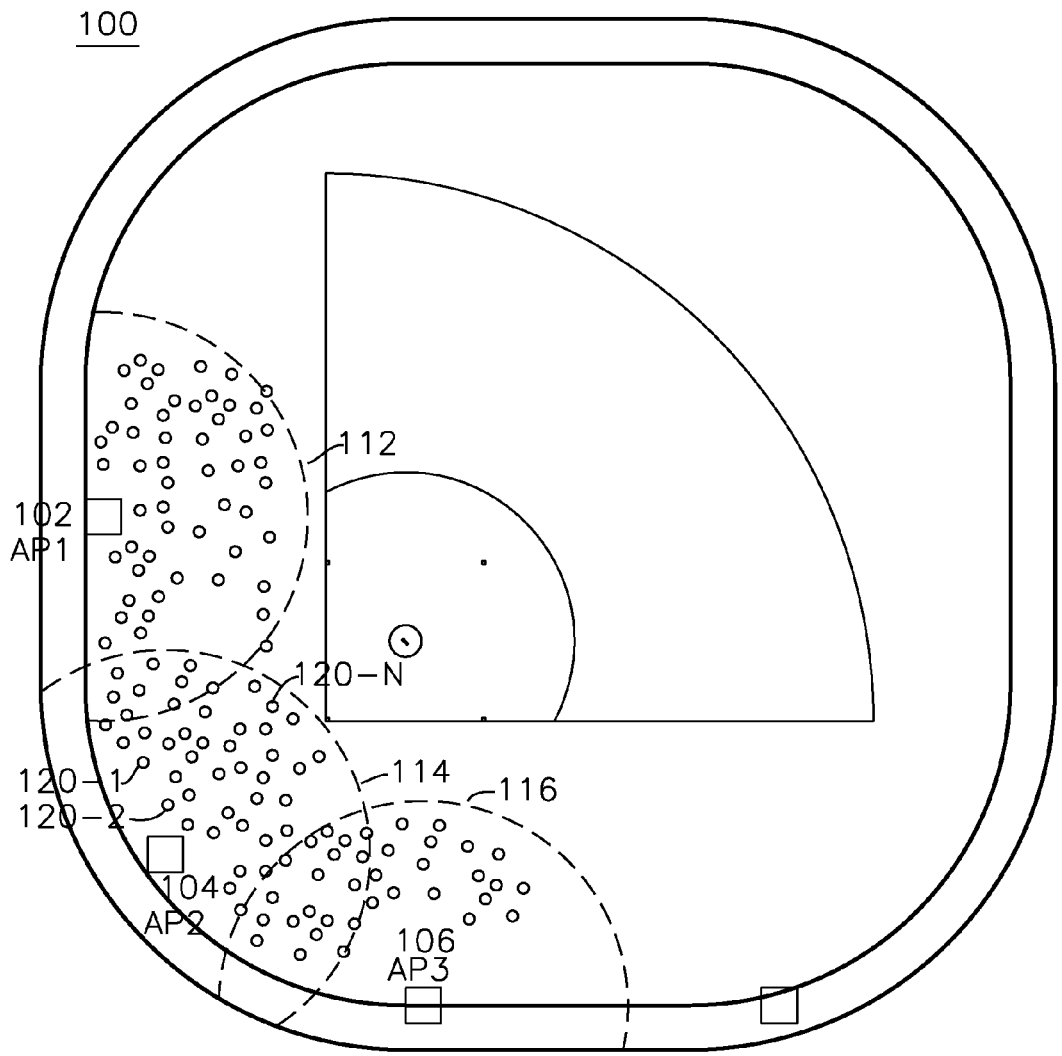
FIG. 1 shows a plan view of high density WLAN stations in a stadium.
Figure 2:
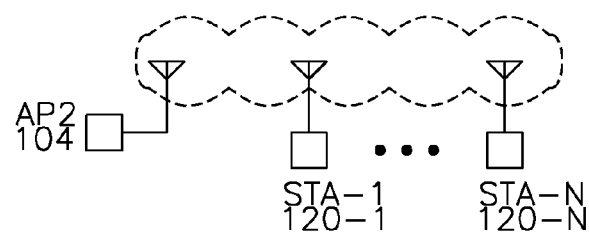
FIG. 2 shows an access point coupled to a plurality of stations.

FIG. 1 shows a stadium 100 with a plurality of access points AP1 102, AP2 104, AP3 106, and may include many other access points (not shown). Each access point such as AP2 104 is associated with a plurality of users 120-1, 120-2, . . . , 120-N. One issue that arises in high density station environments is that a large number of stations 120-1 . . . 120-N may be associated with a particular access point AP2 104, and the number stations actively transmitting and receiving wireless traffic may vary, as can the volume of traffic being transmitted. The present invention describes a method by which WLAN stations 120-1 through 120-N can be organized in groups that would principally be active only during specified segments of a beacon interval from a particular access point such as 104. All client nodes 120-1 through 120-N are synchronized to the Access. Point 104 beacon, and each station 120-1 through 120-N would initiate a new exchange of data packets only in a self-allocated segment (or communication interval) of the beacon interval which is specific to that particular station. The self-allocated segment of the beacon interval is selected using bits of the MAC address of the station for this purpose. The MAC address is globally unique for a particular station and consists of two parts—an Organizationally Unique Identifier (OUI) allotted by the IEEE upon payment and the fulfillment of certain conditions by an organization intending to manufacture or distribute devices that would exist on a standard LAN, and a second part that is unique for each device and generally allotted sequentially by the device manufacturer.

In one example embodiment of the invention shown in FIG. 3, the beacon interval 301 Tb can be divided into four time segments known as communications intervals 320, 324, 328, and 332 for use transmitting or receiving wireless data by stations using that particular communications interval and sharing a particular access point (AP). Client devices or stations with MAC addresses that have the last two bits as '00' such as STA-1 304 would initiate transmission during the first segment or communication interval of the beacon interval, stations H with MAC addresses having the last 2 bits ending in '01' such as STA-2 306 would use the second segment, stations with MAC addresses having the last 2 bits ending in '10' such as STA-3 308 would use the third segment, and stations with MAC addresses having the last 2 bits ending in '11' such as STA-4 would use the fourth segment. By reducing the number of contending nodes to one-fourth of the total number—for example from 300 stations to 75 stations—in the scenario listed in the table above, the probability of collision reduces from over 90% to less than 46%.

FIG. 4 shows another example embodiment where the beacon interval 401 Tb is divided into 8 communications intervals, which are assigned by MAC address according to the last 3 bits of the MAC address ending in '000' for STA-1 404, '001' for STA-2 406, '010' for STA-3 408, '011' for STA-4 410, '100' for STA-5 412, '101' for STA-6 414, '110' for STA-7 416, and '111' for STA-8 418. The shaded communication intervals 420, 422, 424, 426, 428, 430, 432, 434 show the respective subdivided segments of the beacon interval 401 for use by stations with the associated matching three least significant MAC address bits.

The method described herein has the advantage that it is both fully standards compliant and is based on the principle of 'self-policing' or self-allocation. This works best when the MAC addresses are randomly distributed in the network scenario—in the four-segment example, the division based on the least significant bits of the MAC address would result in an approximately equal distribution of clients in each segment. When the addresses are not truly randomly distributed, the load would not be equal in each segment—nevertheless it would be an improvement over a prior-art mechanism.

In one embodiment of the invention, the Access Point operation is unchanged, and the AP transmits packets to stations at any time during the beacon interval, in accordance with the prior art, whereas the stations transmit packets according to the communication interval associated with a particular group of stations, as described herein. Other than increased packet latency, no network performance reduction would be observed, while providing stations on each communications interval reduced congestion.

In another embodiment of the invention, the Access Point also operates using the method described for the H stations, and the AP aggregates and transmits packets for the various stations during the station's associated respective communication interval.

In each embodiment, reduced congestion results, thereby providing more efficient usage of network resources, especially in environments like sports stadiums where a large number of clients simultaneously attempt to use network services.

The method of the invention may be practiced in combination with other congestion reducing techniques, including channel assignment and frequency management methods which subdivide the network into separate wireless channels, each of which operate independently of the other channels, and each with its own AP.

I claim:

1. A method for self-allocation of a wireless LAN station to a segment of a beacon interval, the method comprising:
 a first step of determining a beacon interval;
 a second step of said wireless LAN station self-allocating an interval of said beacon interval for wireless communications, said self-allocating interval being a fraction of said beacon interval and derived from a subset of bits of a unique address identifier of said wireless LAN station;
 a third step of sending wireless data only during said self-allocated interval of said beacon interval and receiving wireless data throughout said beacon interval;
 wherein said address identifier is also used as a source address in a transmission by said wireless LAN station.

2. The method of claim 1 where said unique identifier is the least significant bits of a wireless station MAC address to determine a particular interval.

3. The method of claim 2 where the number of said least significant bits is 2 and the number of self-allocated intervals within said beacon interval is 4.

4. The method of claim 2 where the number of said least significant bits is 3 and the number of self-allocated intervals within said beacon interval is 8.

5. The method of claim 2 where the number of said least significant bits is 4 and the number of self-allocated intervals within said beacon interval is 16.

6. The method of claim 1 where said beacon interval is determined by an access point transmitting said beacon.

7. The method of claim 1 where n is the number of bits used in a unique identifier to determine the number of said beacon intervals, the number of possible self-allocated segments in said beacon interval is $2^n$, each said self-allocated segment is $\frac{1}{2}^n$ of said beacon interval, and said station uses said n bits to self-allocate a particular one of said segments.

8. The method of claim 7 where said n bits are the least significant n bits of said MAC address.

9. The method of claim 1 where said station determines said self-allocated interval by random selection.

10. A wireless LAN station receiving beacon frames from a wireless access point, the beacon frames having a beacon interval, and the wireless LAN station having a MAC address;
 said wireless access point determining the beacon interval;

said wireless LAN station self-allocating an interval of said beacon interval for transmitting wireless data;

where the wireless LAN station determines said beacon interval from said MAC address.

11. The wireless LAN station of claim 10 where said LAN station transmits during said self-allocated interval of said beacon interval, and receives during said beacon interval.

12. The wireless LAN station of claim 10 where the least significant n bits of said LAN station MAC address is used to determine said self-allocating interval.

13. The wireless LAN station of claim 12 where each said self-allocated interval is $½^n$ of said beacon interval.

14. A wireless network having:
an access point transmitting beacons with a beacon interval;
a plurality of stations, each having a unique identifier;
at least one plurality of stations having the same unique identifier certain bits, said plurality of stations transmitting only during a particular self-allocated interval of said beacon interval;
said self-allocated interval derived from said unique identifier certain bits.

15. The wireless LAN station of claim 14 where said unique identifier is the least significant n bits of the MAC address of said station.

16. The wireless LAN station of claim 14 where said self-allocated interval is $½^n$, where n is the number of bits of the MAC address of said station which are used in determining said self-assignment.

17. The wireless LAN station of claim 14 where said unique identifier is a MAC address.

* * * * *